United States Patent [19]

Wiltshire et al.

[11] 3,736,086
[45] May 29, 1973

[54] APPARATUS FOR MAKING FIBER PREFORM

[75] Inventors: Arthur J. Wiltshire; Henry U. Ranallo, both of Cleveland; Frank E. Czumber, Chardon, all of Ohio

[73] Assignee: Structural Fibers, Inc., Chardon, Ohio

[22] Filed: July 1, 1971

[21] Appl. No.: 158,774

Related U.S. Application Data

[62] Division of Ser. No. 742,692, July 5, 1968, Pat. No. 3,654,002.

[52] U.S. Cl. ............... 425/92, 425/101, 425/130, 425/447, 425/470, 425/115, 425/319
[51] Int. Cl. .................... B29c 13/00, B29c 27/26
[58] Field of Search ................. 425/112, 129, 447, 425/470, 45, 96, 130, 223, 375, 449, 101, 115, 319; 264/91

[56] References Cited

UNITED STATES PATENTS

| | | | |
|---|---|---|---|
| 3,170,197 | 2/1965 | Brenner | 425/470 X |
| 3,206,533 | 9/1965 | Serra | 425/470 X |
| 3,102,319 | 9/1963 | Hamson | 425/447 X |
| 3,497,413 | 2/1970 | Ullman et al. | 425/96 X |
| 662,091 | 11/1900 | Ricke | 425/DIG. 14 |
| 1,497,190 | 6/1924 | Moland | 425/DIG. 14 |

*Primary Examiner*—Robert L. Spicer, Jr.
*Attorney*—McNenny, Farrington, Pearne & Gordon

[57] ABSTRACT

A preform suitable for the bag molding of fiber glass articles such as tanks or the like is disclosed. The preform includes a tubular portion and an integrally formed end wall at one end. The wall of the preform consists of a mat formed by a multitude of short lengths of fibers randomly oriented in the wall and bonded by a setable resin which does not fill the voids between the fibers. The form is free of overlaps and seams. A machine and a method for forming this preform is also disclosed. The machine includes a perforated form rotated about its longitudinal axis while vacuum is applied internally. Choppers deposit short lengths of fibers on the rotating form and resin is sprayed onto the fibers as they are deposited. An oven is provided to cure the resin while the preform remains on the form. Power means are provided to remove the preform from the machine. Because the form is rotating while the cutters traverse the length to deposit the fibers, the dominant orientation of the fibers is in a spiral direction. According to a further aspect of the invention, the preform is wound with a continuous filament so that the preform will have additional reinforcing strength characteristics and so that the outside diameter of the preform will be dimensioned to fit within a tubular mold with minimum clearance.

11 Claims, 11 Drawing Figures

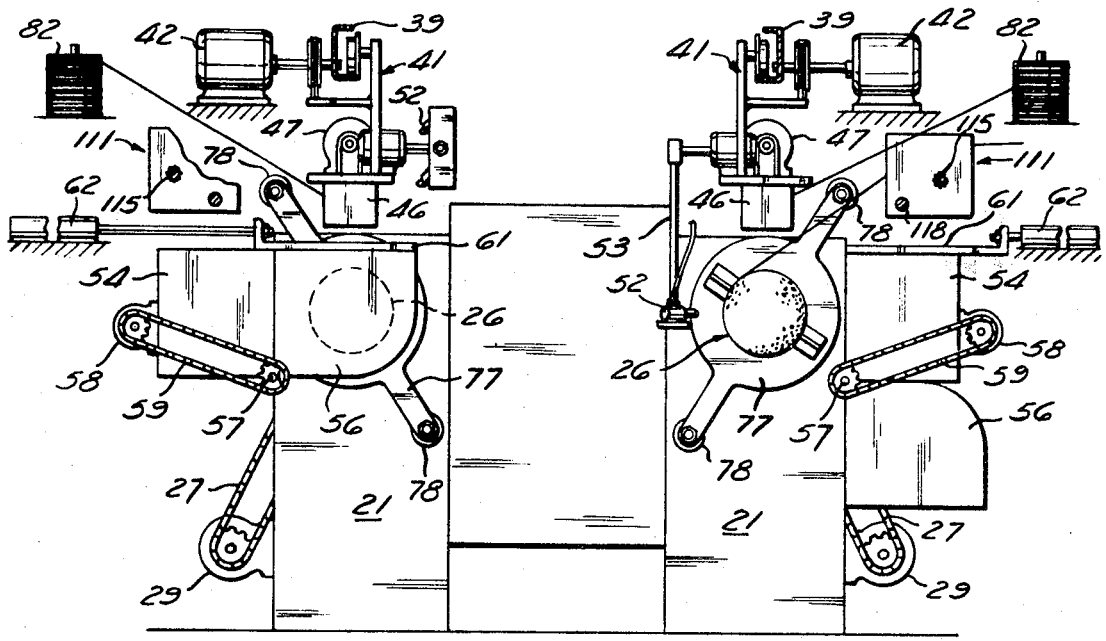
Fig. 2
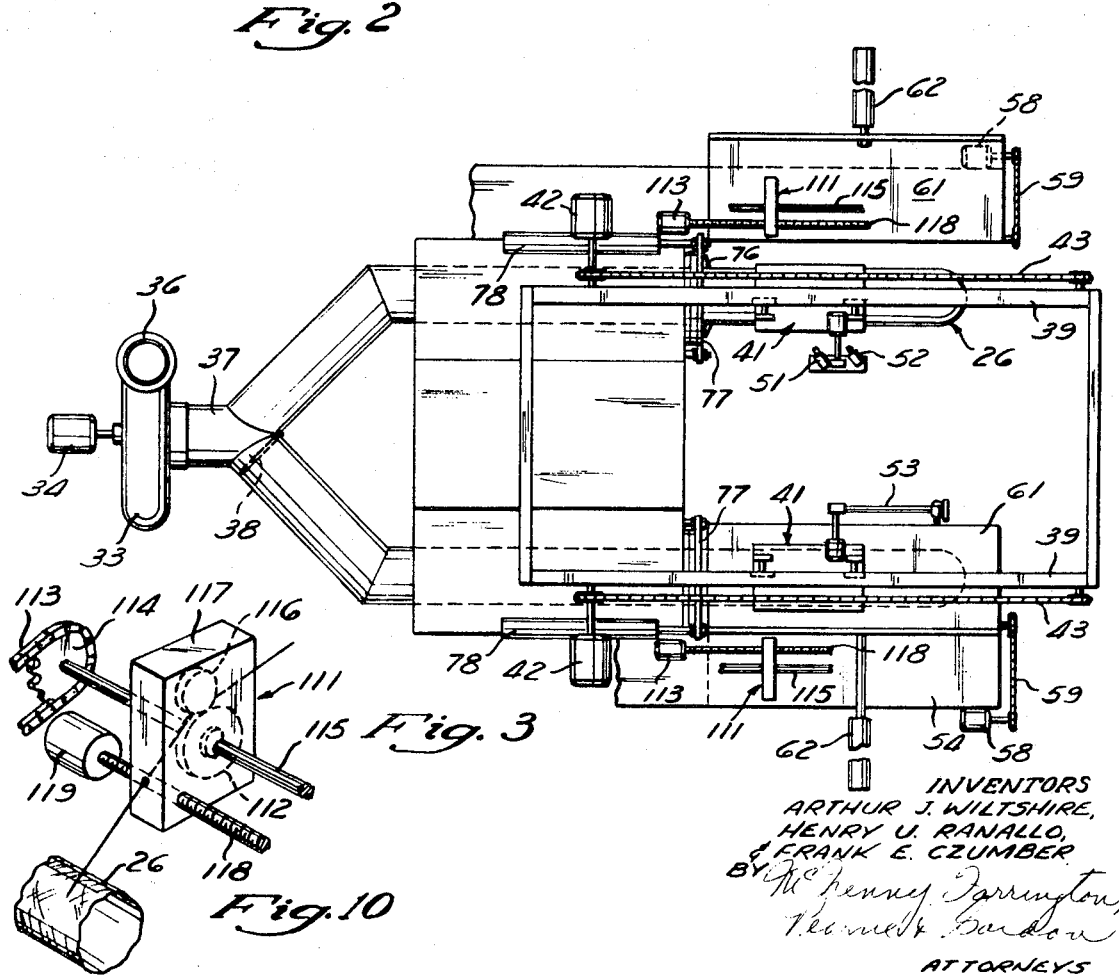
Fig. 3
Fig. 10
INVENTORS
ARTHUR J. WILTSHIRE,
HENRY U. RANALLO,
& FRANK E. CZUMBER
ATTORNEYS

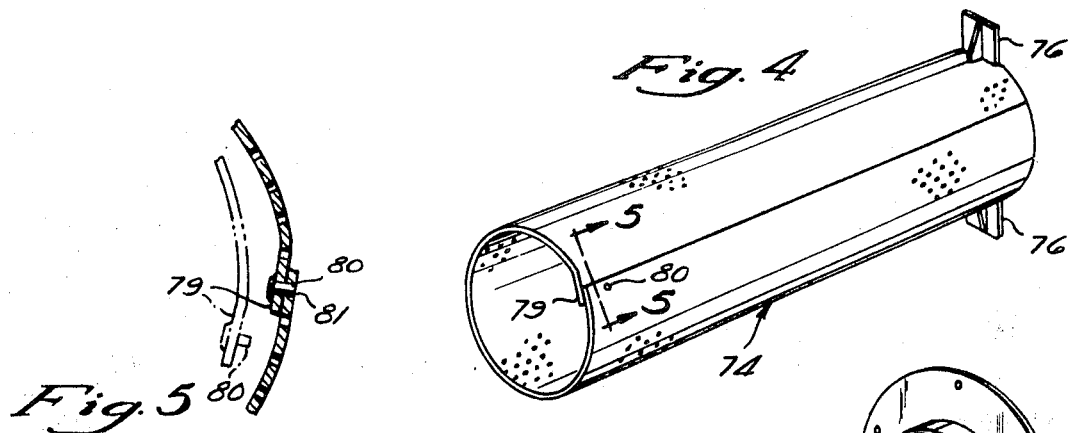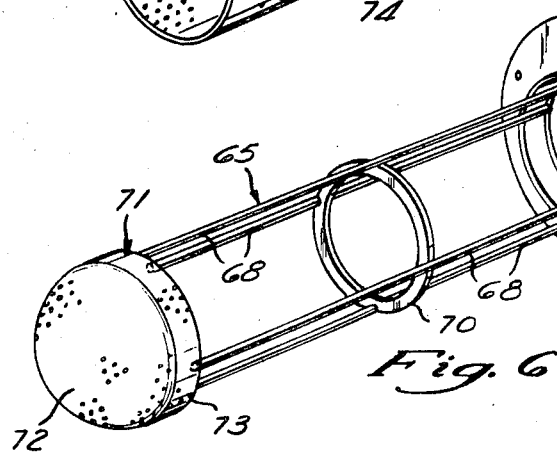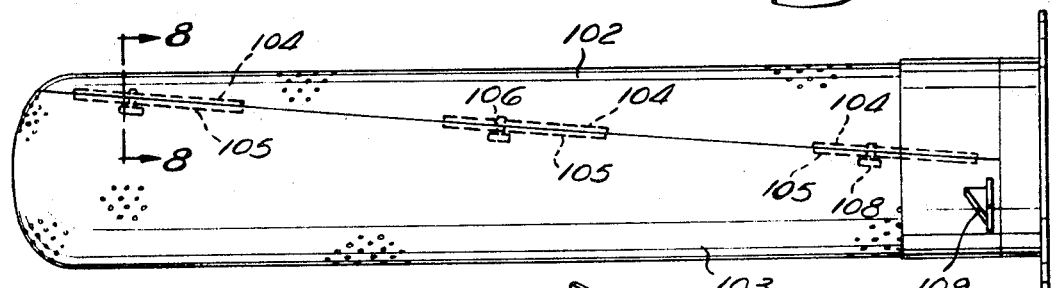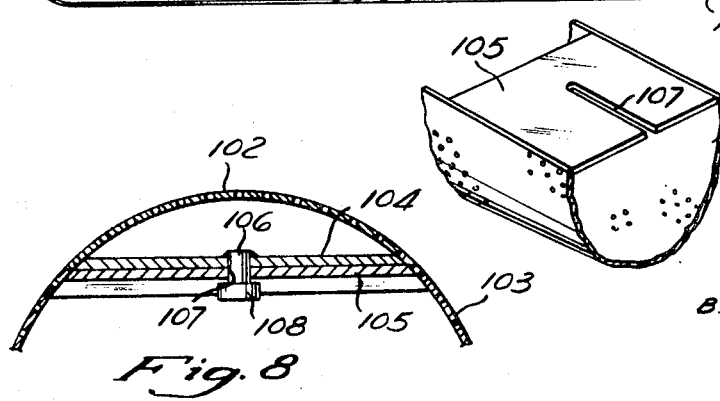

APPARATUS FOR MAKING FIBER PREFORM

RELATED U.S. APPLICATION

Division of Ser. No. 742,692, filed July 5, 1968, now U.S. Pat. No. 3,654,002.

BACKGROUND OF INVENTION

This invention relates generally to the manufacture of fiber reinforced plastic articles such as tanks or the like and more particularly to a novel and improved fiber preform for use in the manufacture of such articles and to a novel and improved method and apparatus for the manufacture of such preforms.

PRIOR ART

In the manufacture of fiber reinforced articles such as tanks and the like, one commonly used method employs forming one or two end preforms and positioning them in a mold with a rolled blanket used for forming the tank side wall. The fiber forming the preform and the blanket is then compressed by inflating a bag within the mold. A resin is then caused to flow through the fiber mat and is cured. Examples of patents describing this method of manufacture are the U.S. Letters Pat. to Wiltshire No. 3,138,507 and Geringer U.S. Pat. No. 3,137,898.

Since the fiber-reinforcing blanket used in such method to form the side walls is formed by rolling a flat sheet of fiber material, a longitudinal overlap results in a unevenness in the amount of fiber-reinforcing material along the longitudinal overlapping portion of the blanket. Further, since the end preforms are separately formed, an overlapping joint is required between the side wall blanket and the preforms. Here again, an irregularity in the amount of reinforcing material is present at the overlapping joints. Still further, the lapping of the joints does not provide a uniform interlocking of the fibers in the area of the lap.

SUMMARY OF INVENTION

The present invention is directed to a novel and improved preform which includes a tubular section and an integral end thereon wherein the fiber forming the preform is uniformly distributed along the entire preform and is distributed along the wall of the preform so the final product provides a uniform high strength without excessive amounts of fiber in any location.

The fiber of the preform consists of short lengths of fiber which are randomly oriented to provide substantial interlocking in the fibers of the completed article. However, the orientation of the fibers is arranged so that there are more fibers extending in a spiral pattern around the tubular section of the preform than lay in other directions. Therefore, the maximum strength of the finished article is available to resist the hoop tension when the article is subjected to internal pressure. Further, the preform includes an integrally formed end joined to the tubular section without any lap so that the maximum amount of strength is achieved with a minimum of fiber material.

The invention also provides a novel and improved method and apparatus for forming a preform for fiber reinforced articles of the type described above. The apparatus for performing the method of this invention includes a perforated form which is rotated about its longitudinal axis while a vacuum is applied internally. A pair of choppers cut fiber reinforcing material, such as glass fibers, into short lengths and direct the fibers toward the rotating form. The vacuum applied to the perforated form causes the fibers to be laid up in a random manner. However, since the form is rotating with respect to the cutters while the cutters traverse longitudinally to deposit the fibers thereon, the dominating orientation of the fibers is in the direction of a spiral extending around the perforated form. The two cutters are arranged with one ahead of the other to sequentially deposit the fiber and insure uniformity.

A binder which is preferably a thermosetting resin is sprayed onto the fibers as they are deposited on the form. The form is provided with a perforated end wall which closes one end of the perforated form and the machine is arranged to deposit the resin and fibers uniformly around the end so the end of the preform is integrally formed with the side wall portion and the fibers are uniformly distributed along the entire surface of the preform including the end.

The apparatus also provides an oven so that the resin of the preform can be cured before it is removed from the machine. Still further, the machine is provided with power means to remove the preform from the machine.

OBJECTS OF INVENTION

It is an important object of this invention to provide a novel and improved preform for the use in manufacture of fiber reinforced articles such as tanks or the like wherein the fibers of the preform are uniformly distributed along the entire wall surface thereof.

It is another important object of this invention to provide a novel and improved method and apparatus for manufacturing a preform as set forth in the preceding object.

Further objects and advantages will appear from the following description and drawings wherein:

FIG. 1a is a perspective view of a preform incorporating this invention;

FIG. 2 is a schematic end view of the machine illustrated in FIG. 1;

FIG. 3 is a schematic plan view of the machine;

FIG. 4 is a perspective view of one type of perforated form which may be used on the machine illustrated in FIGS. 1 through 3;

FIG. 5 is an enlarged fragmentary section taken along 5—5 of FIG. 4 illustrating a lock for the form illustrated in FIG. 4;

FIG. 6 is a perspective view of the support for the form illustrated in FIGS. 4 and 5;

FIG. 7 is a side elevation of a second type of perforated form which may be used on the machine of FIGS. 1 through 3;

FIG. 8 is an enlarged fragmentary section taken along 8—8 of FIG. 7;

FIG. 9 is a fragmentary perspective view of one part of the form illustrated in FIG. 7; and, FIG. 10 is a fragmentary view of a filament winding apparatus provided on the machine.

Figure 1:
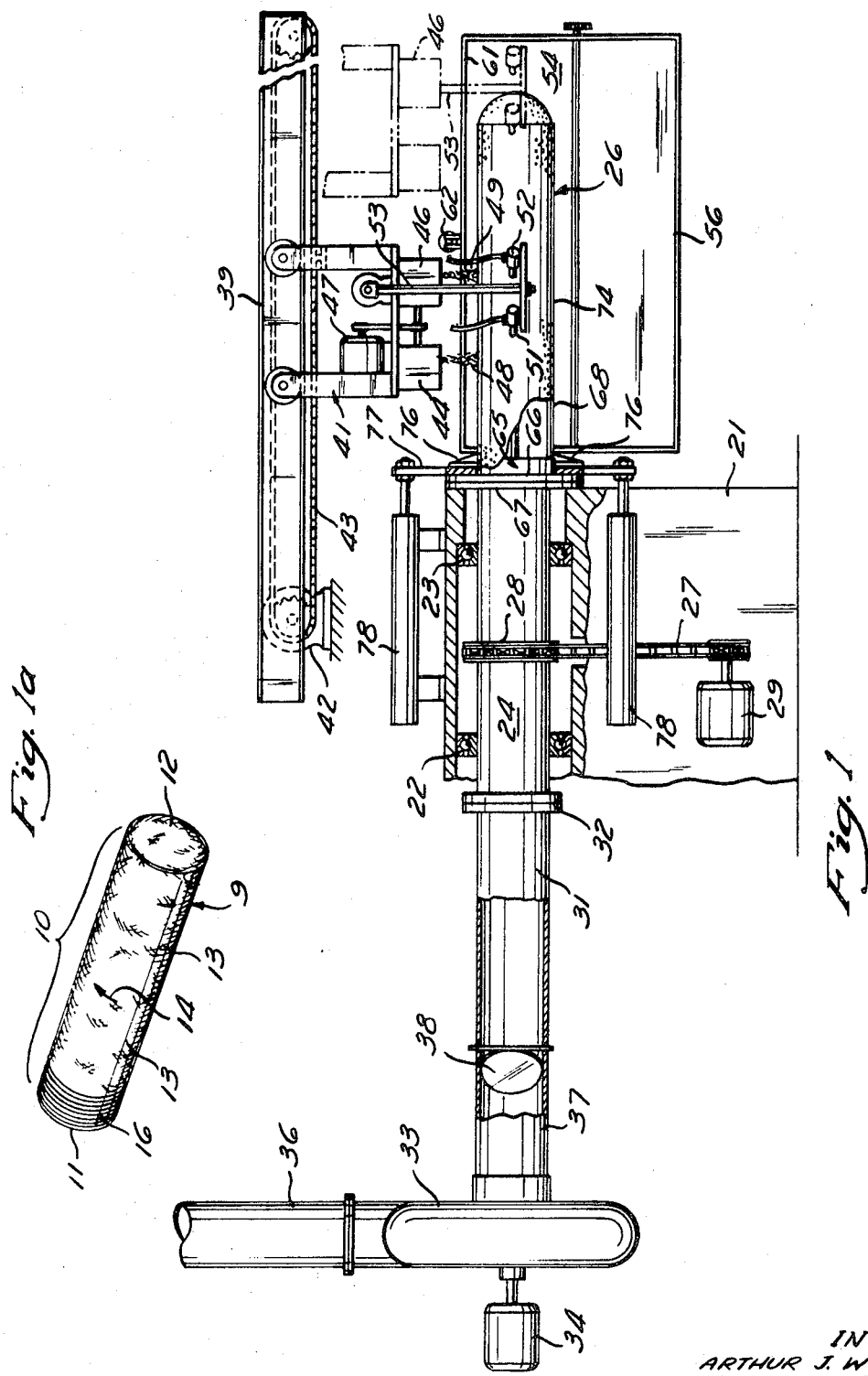
FIG. 1 is a schematic side elevation of a machine incorporating this invention.

FIG. 1a illustrates one embodiment of a preform 9 in accordance with the present invention. This preform is particularly adapted for the manufacture of tanks of the type often used for water softeners or the like. The preform includes a cylindrical wall portion 10 extending from an open end 11 to a generally spherical closed end 12. The preform wall is a loose mat consisting of a multitude of short lengths of fibers 13, such as glass fibers, randomly oriented in the wall forming the cylindrical portion 10 and the end wall 12. The fibers are interlocked with a setable resin such as a thermosetting polyester resin which does not fill the voids between the fibers. Therefore, the preform is relatively compressible and voids are provided so that the preform is well adapted for use in the manufacture of finished articles in accordance with the general method described in the patents cited above.

The illustrated preform is of the type often used in the manufacture of a pressure vessel, and such products are subjected to substantial hoop tension. Therefore, the fibers, although randomly oriented, are preferably arranged so the dominant orientation of the fibers in a spiral direction around the preform as indicated by the arrow 14. The end 12 of the preform is also formed by randomly oriented fibers bonded by a setable resin and has substantially the same density and thickness as the wall portion 10.

In one embodiment of this invention, a preform is manufactured having glass fibers 13 which are about 2 inches long and are bonded by a polyester resin. In such a preform for a tank which is 7 inches in diameter and 35 inches long, the preform weight is between 2.15 pounds and 2.25 pounds. The compressed thickness of the wall is between 0.08 inches and 0.125 inches. The end 12 is integrally formed on the cylindrical portion 10 and the entire preform is free from overlapping joints. In fact the wall of the preform is substantially uniform in density and thickness throughout its extent.

In some instances where higher hoop strength is required, the preform is wound with continuous fiber strands as illustrated at 16. In FIG. 1a the winding 16 is illustrated only at one end to demonstrate how the preform may be wound. However, the winding can, and normally would, extend the full length of the preform. Such a preform with peripheral winding is suitable for the manufacture of pressure vessels having higher hoop strength requirements.

Reference should now be made to FIGS. 1 through 3 for a clear understanding of a machine for manufacturing a preform of the type illustrated in FIG. 1a. This machine includes a frame 21 which supports spaced bearings 22 and 23 which journal a rotatable tubular form supporting duct 24. A perforated form 26 is mounted on the end of the tubular duct 24 for rotation therewith. A drive chain 27 is connected to a sprocket 28 on the tubular duct 24 and is driven by a motor 29 to provide the motive power for rotating the tubular duct 24. The end of the tubular duct 24 opposite the form 26 is connected to a non-rotating duct 31 through a coupling 32 which provides an air-tight joint therebetween while permitting relative rotation. The duct 31 connects to a fan 33 driven by a motor 34 so that the fan 33 applies a vacuum to the perforations of the form 26. The air from the fan is exhausted through a duct 36.

In the preferred embodiment of the machine, there are two spaced, but parallel, rotating form supporting ducts 24 which are similar to each other and which are connected through a Y fitting 37 (illustrated in FIG. 3) to the fan 33. A damper 38 is located in the Y to permit the vacuum produced by the fan 33 to be selectively applied to one or the other of the forms as described in more detail below.

The illustrated embodiment of the machine incorporates two similar forms and two groups of accessory equipment associated with each form. Therefore, only one form and its associated accessorie will be described in detail with the understanding that the description applies equally to the other form and its associated accessories.

Mounted on a track 39 which extends above the form 26 is a carriage 41 which is supported by the track 39 for traversing movement along the length of the form 26. A motor 42 is connected through a chain 43 to provide the power for traversing the carriage 41. Mounted on the carriage 41 are two similar fiber choppers 44 and 46 which are spaced from each other in the direction of the length of the form 26. A single motor 47 is connected to drive the two choppers through suitable clutches. These choppers 44 and 46 operate to cut continuous filaments of fiber glass or the like into short lengths to form the separated pieces of fiber and operate to direct the cut pieces downwardly against the form 26 as illustrated at 48 and 49.

Also mounted on the carriage 41 are a pair of spray nozzles 51 and 52 which are supported beside the form 26 on a retractable arm 53. These nozzles 51 and 52 are adapted to spray the settable resin onto the exterior of the form in the area in which the cutters 44 and 46, respectively, are depositing pieces of fiber.

Positioned beside each form 26 is a curing oven which can be closed around the form after the fiber and resin are deposited thereon to heat the resin and cure it before the preform is removed from the machine. The oven includes a burner box 54 mounted beside the form 26. Pivotally mounted on the burner box 54 is a lower cover 56 pivoted at 57 for movement between retracted and extended positions. The cover 56 illustrated in the right side of FIG. 2 is retracted and the cover 56 as illustrated in the left side of FIG. 2 is extended. The power for moving the covers 56 between the extended and retracted positions is supplied by associated motors 58 connected by chains 59 to the covers 56. The top of the cover 56 is closed by a retractable top closure 61 which is slidable along the top of the burner box 54 between retracted and extended positions. Here again the closure 61 illustrated at the right of FIG. 2 is retracted and the closure at the left is extended. Actuators 62 are provided for the retraction and extension of the associated closures 61. When the lower cover 56 and the top closure 61 are extended as illustrated on the left, the associated form 26 is completely enclosed so that the hot air from the burner box 54 heats the preform to cure the resin. After the curing cycle is completed, the cover 56 and the closure 61 are retracted to provide access to the preform. The retractable arm 53 which supports the nozzles 51 and 52 is moved to a horizontal position as illustrated in the left of FIG. 2 during curing so that the nozzles are clear of the curing oven structure.

FIGS. 4 through 6 disclose one preferred embodiment of a form structure and the structure of the support for the form. Mounted on the machine is a form support structure 65 illustrated in FIG. 6. This support structure includes a face plate 66 which is adapted to be bolted to a mating face plate 67 (illustrated in FIG. 1). Extending from the face plate 66 are four symmetrically positioned support rods 68 which are anchored at one end on a flange 69 on the face plate 66 are are anchored at their opposite end on an end form element 71. Intermediate support is provided by a ring 70.

The end form element 71 is provided with a generally spherical perforated end well 72 and axially extending flanges 73. A cylindrical removable element 74 (illustrated in FIG. 4) is proportioned to fit over the rods 68 to cooperate with the end element 71 to form the complete form 26. The cylindrical element 74 is formed with lateral projections 76 at one end and is proportioned so that when the cylindrical element 74 is properly positioned on the support 65, the lateral projections 76 are positioned adjacent to one side of a push-off ring 77 mounted on the machine. The push-off ring 77 (illustrated in FIGS. 1 and 2) is axially movable along the form support by actuators 78 to cause the cylindrical element 74, along with the preform, to be stripped off the form support.

The open end of the cylindrical element 74 opposite the projection 76 is proportioned to overlap the flange section 73 a slight amount so that the form is continuous when assembled. Preferably the end element 71 and the cylindrical element 74 are formed of sheet stock which is provided with perforations along the entire surface.

After the cylindrical element 74 and the preform formed therearound is stripped off of the support illustrated in FIG. 6, the preform can be collapsed by releasing lock pins 80 to collapse the form. As illustrated in FIG. 5, the lock pins 80 are carried by one longitudinal edge 79 and are positioned to project through mating openings 81 along the opposite longitudinal edge to maintain the form to the extended position. When collapse of the form is required, the edge 79 is pulled inwardly releasing the lock pins 80 and allowing the form to collapse inwardly as illustrated in phantom in FIG. 5. The preform can then be removed from the cylindrical element 74 and the element can be reused to form a subsequent preform.

The machine is preferably controlled by a suitable automated control system to automatically operate through a predetermined cycle. Suitable limit switches and control circuits are provided for this automated operation. However, the circuitry is not illustrated since persons skilled in the art can easily provide suitable circuits to produce the desired operational cycle.

At the beginning of a cycle a cylindrical element 74 is positioned on the form support and the damper 38 is shifted to connect the inlet of the fan 33 to the form. This applies a vacuum to the perforations of the form. The motor 29 is energized to cause rotation of the form. The carriage 41 is traversed to the left as viewed in FIG. 1 until the cutter 46 is adjacent to the end of the form 26 remote from the closed end.

The operation of the cutter 46 is initiated to cause fibers to feed from a spool 82 (illustrated in FIG. 2) to the cutter where the continuous strands are chopped into short lengths of fiber. The cutter then operates to direct the short lengths of fiber onto the form where the vacuum causes the fibers to collect. The operation of the nozzle 52 is then initiated to cause the resin to be sprayed onto the fibers as they are deposited on the form.

The deposit of fibers at the open end of the form occurs for a predetermined length of time before the traversing motor 42 is started to cause the carriage to traverse toward the closed end of the form. This insures that a sufficient layer of fibers will be deposited at the open end of the form. The motor 42 is then energized to cause the carriage to traverse to the right as viewed in FIG. 1 toward the closed end of the form. When the carriage is traversed along the form for a sufficient distance to position the cutter 44 at the open end of the form, this cutter is also started by engaging its clutch and the operation of the nozzle 51 is initiated. The carriage 41 continues to traverse along the form depositing the fibers thereon toward the closed end formed by the end element 71. Since the cutter 44 traverses behind the cutter 46, two separate applications of fiber and resin is supplied to the form to insure that a uniform thickness will be produced in the wall of a preform.

When the carriage reaches the phantom position of FIG. 1, the cutter 46 is directing fibers down along the end surface 72 of the end element 71. Because the fibers along the cylindrical portion of the form partially close the adjacent perforations, there is a tendency for the vacuum to build up at the end by the time it is coated with fibers. This assists in tending to cause the fibers to be properly positioned around the end to completely close the end and form a uniform wall thickness thereon.

When the cutter 46 reaches the phantom position, the operation of the cutter 46 and its associated nozzle 52 is terminated, but traversing is continued until the cutter 44 reaches the end of the form. At this time the operation of the cutter 44 and the associated nozzle 51 is automatically terminated, completing the deposit of fiber and resin on the form.

The carriage 41 can then be traversed back to its initial position and the nozzles are moved up out of the way by movement of the retraction arm 53 to the horizontal position. The actuator 62 and the motor 58 are then operated to extend the lower cover 56 and the top closure 61 so that the form with the preform thereon is enclosed for curing. The burners, which may be of any suitable type such as gas burners, then supply heat to cure the resin. After the resin is cured, the top 61 and the cover 56 are retracted clear of the form and preform. The actuators 78 are then operated to strip the cylindrical element 74 off of the form support. This stripping action causes the fibers at the end to move free of the end element 71 since the resin is already cured and the preform is sufficiently rigid to permit this action. The cylindrical element is then collapsed and the preform is removed, completing the cycle of operation.

It should be appreciated that the form 26 may be traversed with only one cutter and its associated nozzle in operation and then traversed in the opposite direction by the other cutter and its associated nozzle while the form 26 is rotated in the same direction. This will produce a preform wherein the orientation of the fibers is random but with more fibers extending in a helical pattern. Such a helical pattern may also be produced by traversing the form 26 in one direction with a single cutter and associated nozzle, reversing the rotation of the form 26 while again traversing the form in the same direction with the other cutter and its associated nozzle operating.

By providing two forms on the machine and two groups of accessories, the machine can be cycled so that the curing of one preform on one form is occurring while the fiber and resin are applied to the other form. In this way, the output of the machine can be relatively continuous even though only one fan is utilized to produce the vacuum in the forms.

FIGS. 7 through 9 illustrate a second embodiment of a form which may be used with this machine. This form again includes a mounting flange 101 which can be secured to the flange 67 of the rotating duct 24. The form includes two parts 102 and 103 which cooperate, when the two parts are in the position illustrated in FIG. 7, to produce the cylindrical portion and the generally spherical end wall portion of the device. The upper part 102 is rigidly mounted on the mounting flange 101 and the lower part is supported by the upper part by inclined connectors (best illustrated in FIGS. 8 and 9). These connectors include an upper plate 104 and a lower plate 105. The upper plates are secured to the upper part 102 at spaced locations and the lower plates 105 are secured to the lower part 103 at similar spaced locations. Mounted on the upper plates 104 are headed fasteners 106 which extend through slots 107 in the lower plates 105 and are provided with heads 108 which hold the plates together. Therefore, the two parts 102 and 103 are held together along an inclined plane, but are axially movable relative to each other. The lower part 103 is provided with peripherally spaced lateral projections 109 which are engaged by the stripper ring 77 when the stripper ring is extended.

With this embodiment, extension of the actuator 78 causes the lower part 103 to move along the upper part and causes the preform to be carried along the upper part 102 to a location where the combined peripheral extent of the upper and lower parts is smaller, and the preform may be removed without completely removing the lower part 103 from the machine.

If the preform is to be wound with a continuous filament, a filament metering device 111 is provided. The device 111 has a filament metering roll 112 which is driven on a 1:1 ratio with the duct 24 and the form 26 by a suitable drive chain 113 and by a sprocket (not shown) provided on the duct 24. The drive chain 113 cooperates with a sprocket 114 which drives a splined shaft 115. The metering roll 112 is slidably mounted on and is driven by the splined shaft 115. A pinch roll 116 cooperates with the metering roll 112 and the rolls 116 and 112 are mounted within a housing 117. The housing 117 is driven by a lead screw 118 so that the rolls 112 and 116 traverse the extent of the cylindrical side wall of the preform.

The splined shaft 115 extends through the housing 117 by means of suitable bearings which permit the shaft 115 to rotate relative to the housing 117 but permit the housing 117 to be driven relative to the axis of the shaft 115. Suitable spacers are provided between the metering roll 112 and the housing 117 so that the roll 112 does not rub on the housing. The lead screw 118 is powered by a reversing motor 119.

With a continuous filament trained between the rolls 112 and 116, and attached to the preform, the rate of traverse of the filament is adjusted with respect to the rotational speed of the preform to provide the desired orientation and density of the peripheral windings on the preform. After one pass with the continuous filament, the motor 119 may be reversed to provide another winding on the preform at a predetermined angle with respect to the first winding. The diameter of the roll 112 is slightly smaller than the inside diameter of the hollow mold into which the preform is to be inserted so that the wound outside diameter of the preform will just clear the inside diameter of the hollow mold and fit snugly therein. It should be appreciated that if substantial clearance were provided between the preform and inner surface of the mold, the molded article would have an undesirable resin rich outer surface which would be subject to crazing or cracking.

With the machine and method incorporating this invention, a uniform preform may be produced. If a thicker wall is desired, the traversing speed of the carriage 41 can be reduced or the speed of the choppers 44 and 46 can be increased. Similarly, the amount of resin deposited can be regulated by adjusting the flow through the nozzles 51 and 52. It has been found that preforms incorporating this invention provide a more uniform, higher strength finished article with a minimum total fiber content, since overlaps at the closed end of the preform and lengthwise of the preform are eliminated.

Although a preferred embodiment of this invention is illustrated, it is to be understood that various modifications and rearrangements of parts may be resorted to without departing from the scope of the invention disclosed and claimed herein.

We claim:

1. A machine for making preforms for fiber reinforced plastic articles comprising a frame, an elongated form journaled on said frame for rotation about its longitudinal axis, said form having a cylindrical sidewall and an end wall and being provided with perforations in its outer surface, a pump connected to apply a vacuum to said perforations, fiber chopping means mounted to traverse the length of said form along a path which is uniformly spaced from the cylindrical sidewall of said form and deposit fibers on the outer surface thereof, means to drive said fiber chopping means along said path, and means to coat said fibers with a settable resin without filling the voids therebetween.

2. A machine as set forth in claim 1 wherein said resin is thermosetting, and heating means are provided to cure said resin while said fibers remain on said form.

3. A machine as set forth in claim 1 wherein said form is collapsible to permit said preform to be removed therefrom.

4. A machine as set forth in claim 1 wherein said machine is provided with filament winding means to wind a continuous filament over the fiber preform.

5. A machine as set forth in claim 4 wherein said filament winding means includes metering roll means to deliver said filament to said preform under a predetermined tension so that said preform has an outer diameter which snugly fits in a hollow mold.

6. A machine as set forth in claim 5 wherein the metering roll has a diameter which is slightly less than the inside diameter of said hollow mold.

7. A machine as set forth in claim 4 wherein said form is mounted on a form support, and power means are provided to remove said form and preform from said support.

8. A machine as set forth in claim 4 wherein power means are provided to collapse said form.

9. A machine as set forth in claim 1 wherein said fiber chopping means includes two cutters operable to sequentially traverse said form in the same direction.

10. A machine as set forth in claim 1 wherein said means to coat said fibers is a spray device which traverses said form with said fiber chopping means and coats fibers deposited on said form by said fiber chopping means.

11. A machine as set forth in claim 1 wherein said form includes two mating parts joined together along a diagonally extending plane which cooperate to form a cylindrical outer surface when in one position, said two parts being longitudinally movable relative to each other to reduce the diameter of said form and permit removal of a preform thereof.

* * * * *